Figure 1:
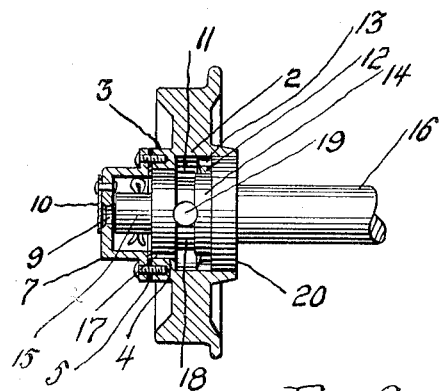

G. WEINSCHENKER.
LUBRICATOR FOR PIT CAR WHEELS.
APPLICATION FILED AUG. 12, 1912.

1,089,169.

Patented Mar. 3, 1914.

WITNESSES

Samuel Payne

K. H. Butler

INVENTOR
G. WEINSCHENKER.
By N. C. Evert Co.
ATTORNEY

UNITED STATES PATENT OFFICE.

GUSTAVE WEINSCHENKER, OF NEW ALEXANDRIA, PENNSYLVANIA.

LUBRICATOR FOR PIT-CAR WHEELS.

1,089,169.  Specification of Letters Patent.  Patented Mar. 3, 1914.

Application filed August 12, 1912. Serial No. 714,602.

*To all whom it may concern:*

Be it known that I, GUSTAVE WEINSCHENKER, a citizen of the United States of America, residing at New Alexandria, in the county of Westmoreland and State of Pennsylvania, have invented certain new and useful Improvements in Lubricators for Pit-Car Wheels, of which the following is a specification, reference being had therein to the accompanying drawing.

This invention relates to a lubricator for pit-car wheels, and the primary object of my invention is to furnish the hub of a pit-car wheel with a lubricant reservoir from which a suitable lubricant can be fed to the spindle of a car axle to insure an easy and non-frictional movement of the wheel upon the axle spindle.

A further object of this invention is to provide a lubricator for pit-car wheels that consists of comparatively few parts, easily and quickly assembled to provide a strong and durable structure.

These and such other objects as may hereinafter appear are attained by a mechanical construction that will be presently described in detail and then claimed.

Reference will now be had to the drawing, wherein like numerals denote corresponding parts throughout the several views, in which:—

Figure 2:
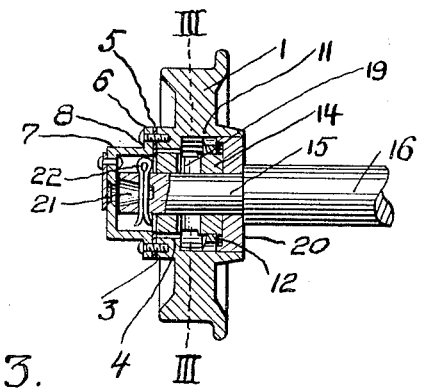
Figure 3:
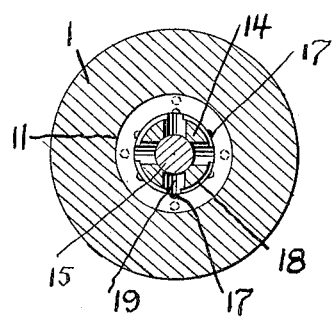
Figure 4:
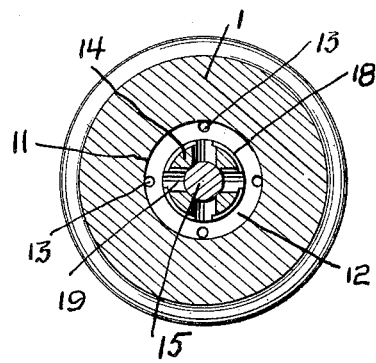

Figure 1 is a plan of the lubricator partly in section. Fig. 2 is a horizontal sectional view of the lubricator. Fig. 3 is a vertical cross sectional view taken on the line III—III of Fig. 2, looking in one direction, and Fig. 4 is a similar view taken on the same line looking in the opposite direction from that of Fig. 3.

The reference numeral 1 denotes a pit-car wheel having a hub 2 and the outer side of the hub 2 is closed by an inwardly extending annular flange 3 providing a concentric opening 4. Arranged against the flange 3 is a gasket 5 and arranged against the gasket 5 is the annular flange 6 of a cap 7, said flange being secured to the hub 2 by a plurality of screws 8 or other fastening means. The cap 7 is hollow and constitutes a lubricant reservoir. Lubricant is admitted to the reservoir through a small opening 9 formed in the outer end of the cap and said opening is normally closed by a pivoted shutter 10 or other suitable closure.

The inner side of the hub 2 has an annular recess 11 and intermediate the ends of said recess there is a web 12 that is formed integral with the hub. The web 12 is annular and the opening of said web corresponds in diameter to the opening 4. The web 12 adjacent to the annular wall of the recess 11 has a plurality of circumferentially arranged ports 13, the object of which will presently appear.

Snugly fitted in the opening of the web 12 and the opening 4 is a cylindrical bearing 14 that receives a spindle 15 of a car axle 16. The outer face of the bearing 14 is flush with the outer face of the flange 3 and the wall of the opening 4 which is formed by the flange 3 is provided with a plurality of longitudinally extending grooves 17 which establish communication between the interior of the cap and the recess 11. The bearing 14 within the recess 11 has the periphery thereof provided with a circumferentially arranged groove 18 that is in communication with radially disposed openings 19 formed in said bearing. It is through the medium of the openings 19 that a lubricant can feed directly upon the spindle 15 of the axle. The bearing 14 is of a less length than the hub 2 and fitted in the open end of the recess 11 against the end of the bearing 14 is a circular flanged plug 20, said plug being spaced away from the web 12 through the medium of its flange, whereby the lubricant that passes through the ports 13 can pass between said plug and the end of the bearing onto the spindle 15.

The end of the spindle 15 has a conical-shaped recess 21 confronting the filling opening 9 and arranged transversely of the recessed end of said spindle is a cotter pin 22. This pin is adapted to retain the spindle 15 within the bearing 14 and the plug 20. Lubricant entering the recess 21 of the spindle can work its way through the openings that receive the cotter pin 22.

It is thought that the utility of the lubricating device will be apparent without further description, and while in the drawing there is illustrated a preferred embodiment of the invention, it is to be understood that the structural elements are susceptible to such changes as fall within the scope of the appended claim.

What I claim is:—

In combination, a wheel having a hub provided at its outer end with an inwardly extending annular flange forming a concentric opening, said hub having its inner face provided with an annular web spaced from said flange, an annular bearing surrounded by said flange and web, said bearing projecting beyond the web, a flanged plug mounted in the inner end of the hub and having its flange abutting against the web for spacing the plug from the web, said plug abutting against said bearing, a flanged cap secured to said flange of the hub and provided with a filling opening, said flange provided with grooves for establishing communication between the interior of the hub and cap, said web provided with a series of ports and said bearing provided centrally with a circumferentially arranged groove and radially disposed openings communicating with said groove.

In testimony whereof I affix my signature in the presence of two witnesses.

GUSTAVE WEINSCHENKER.

Witnesses:
MAX H. SROLOVITZ,
KATHERINE ERRETT.

Copies of this patent may be obtained for five cents each, by addressing the "Commissioner of Patents, Washington, D. C."